US008313280B2

(12) United States Patent
Hurwitz et al.

(10) Patent No.: US 8,313,280 B2
(45) Date of Patent: Nov. 20, 2012

(54) METHOD AND DEVICE TO AVOID TURBO INSTABILITY IN A GAS TURBINE ENGINE

(75) Inventors: Wayne Hurwitz, West Hartford, CT (US); Glenn Levasseur, Colchester, CT (US)

(73) Assignee: United Technologies Corporation, Hartford, CT (US)

( * ) Notice: Subject to any disclaimer, the term of this patent is extended or adjusted under 35 U.S.C. 154(b) by 724 days.

(21) Appl. No.: 12/442,146

(22) PCT Filed: Oct. 12, 2006

(86) PCT No.: PCT/US2006/039798
§ 371 (c)(1),
(2), (4) Date: Mar. 20, 2009

(87) PCT Pub. No.: WO2008/045052
PCT Pub. Date: Apr. 17, 2008

(65) Prior Publication Data
US 2009/0245997 A1   Oct. 1, 2009

(51) Int. Cl.
*F01D 17/14* (2006.01)
(52) U.S. Cl. .................. 415/1; 60/204; 60/771
(58) Field of Classification Search .......... 60/204, 60/226.1, 226.3, 771; 415/1, 48, 13
See application file for complete search history.

(56) References Cited

U.S. PATENT DOCUMENTS

| | | | |
|---|---|---|---|
| 3,523,423 A | 8/1970 | Young | |
| 4,130,872 A * | 12/1978 | Haloff | 701/100 |
| 4,159,625 A | 7/1979 | Kerr | |
| 4,242,864 A * | 1/1981 | Cornett et al. | 60/226.1 |
| 4,292,802 A | 10/1981 | Snow | |
| 4,294,069 A * | 10/1981 | Camp | 60/238 |
| 4,414,807 A * | 11/1983 | Kerr | 60/204 |
| 5,259,188 A * | 11/1993 | Baxter et al. | 60/204 |
| 5,305,599 A * | 4/1994 | Marvin | 60/226.3 |
| 5,448,881 A * | 9/1995 | Patterson et al. | 60/794 |

FOREIGN PATENT DOCUMENTS

| | | |
|---|---|---|
| DE | 28 02 785 | 8/1978 |
| DE | 29 51 962 | 7/1980 |
| EP | 0 005 135 | 10/1979 |
| GB | 2 198 999 | 6/1988 |

OTHER PUBLICATIONS

International Search Report for PCT Application No. PCT/US2006/039798, Sep. 19, 2007.

* cited by examiner

*Primary Examiner* — Ross Gushi
(74) *Attorney, Agent, or Firm* — Carlson, Gaskey & Olds, P.C.

(57) ABSTRACT

(A1) A turbofan engine control system is provided for managing a fan operating line. The engine (10) includes a spool having a turbine housed in a core nacelle (12). A turbofan (20) is coupled to the spool (14). A fan nacelle (34) surrounds the turbofan and core nacelle and provides a bypass flow path having a nozzle exit area (40). A controller (50) is programmed to effectively change the nozzle exit area in response to an undesired turbofan stability margin which may result in a stall or flutter condition. In one example, the physical nozzle exit area is increased at the undesired stability condition in which the airflow into the engine creates a destabilizing pressure gradient at the inlet side of the turbofan. A turbofan pressure ratio, turbofan pressure gradient, low spool speed and throttle position are monitored to determine the undesired turbofan stability margin.

18 Claims, 3 Drawing Sheets

METHOD AND DEVICE TO AVOID TURBO INSTABILITY IN A GAS TURBINE ENGINE

This application claims priority to PCT Application Ser. No. PCT/U.S.2006/039798, filed on Oct. 12, 2006.

BACKGROUND OF THE INVENTION

This invention relates to a turbofan engine, and more particularly, the invention relates to managing the turbofan engine's fan operational line.

A typical turbofan engine includes low and high spools. The low spool is coupled to a fan or turbofan and typically supports a low pressure turbine and compressor. The spools, turbine and compressor are housed in a core nacelle. The turbofan is arranged upstream from the core nacelle. A fan nacelle surrounds the turbofan and core nacelle to provide a bypass flow path. Airflow enters the engine through an inlet cowl provided by the fan nacelle before reaching the turbofan.

Maintaining aerodynamic stability of the fan in large commercial high bypass turbofan engines is a significant factor for overall engine performance. The fan operating characteristics are set to maintain sufficient fan stability margin at all operating conditions. One of the important performance limitations for the fan is the loss in fan stability margin that occurs during aircraft maneuvers and cross-wind operating conditions. During a maneuver or in a cross-wind, the inlet flow approaches the aircraft inlet in a direction that is not inline with the inlet axis of the engine. This can cause local pressure gradients and flow separation on the inlet cowl lip that results in significant pressure distortion entering the fan.

The increase in inlet distortion results in the loss of fan stability margin. If the distortion is excessive, the resulting loss in stability margin can lead to instability, stall or flutter of the fan. Therefore, the nominal fan operating line must be set such that sufficient stability margin is maintained, which typically causes the operating line to be lower than desired for overall engine performance throughout the flight envelope.

What is needed is a fan operating line provided such that sufficient fan stability margin is maintained without compromising the overall engine performance.

SUMMARY OF THE INVENTION

A turbofan engine control system is provided for managing a fan operating line. The engine includes a spool having a turbine housed in a core nacelle. A turbofan is coupled to the spool. A fan nacelle surrounds the turbofan and core nacelle and provides a bypass flow path having a nozzle exit area. A controller is programmed to effectively change the nozzle exit area in response to an undesired turbofan stability margin above which a stall or flutter condition may result. In one example, the physical nozzle exit area is increased at the undesired stability condition in which the airflow into the engine creates a destabilizing pressure gradient at the inlet side of the turbofan. In one example, a turbofan pressure ratio, turbofan inlet pressure gradient, low spool speed and throttle position are monitored to determine the undesired turbofan stability margin.

These and other features of the present invention can be best understood from the following specification and drawings, the following of which is a brief description.

DETAILED DESCRIPTION OF THE PREFERRED EMBODIMENT

Figure 1:
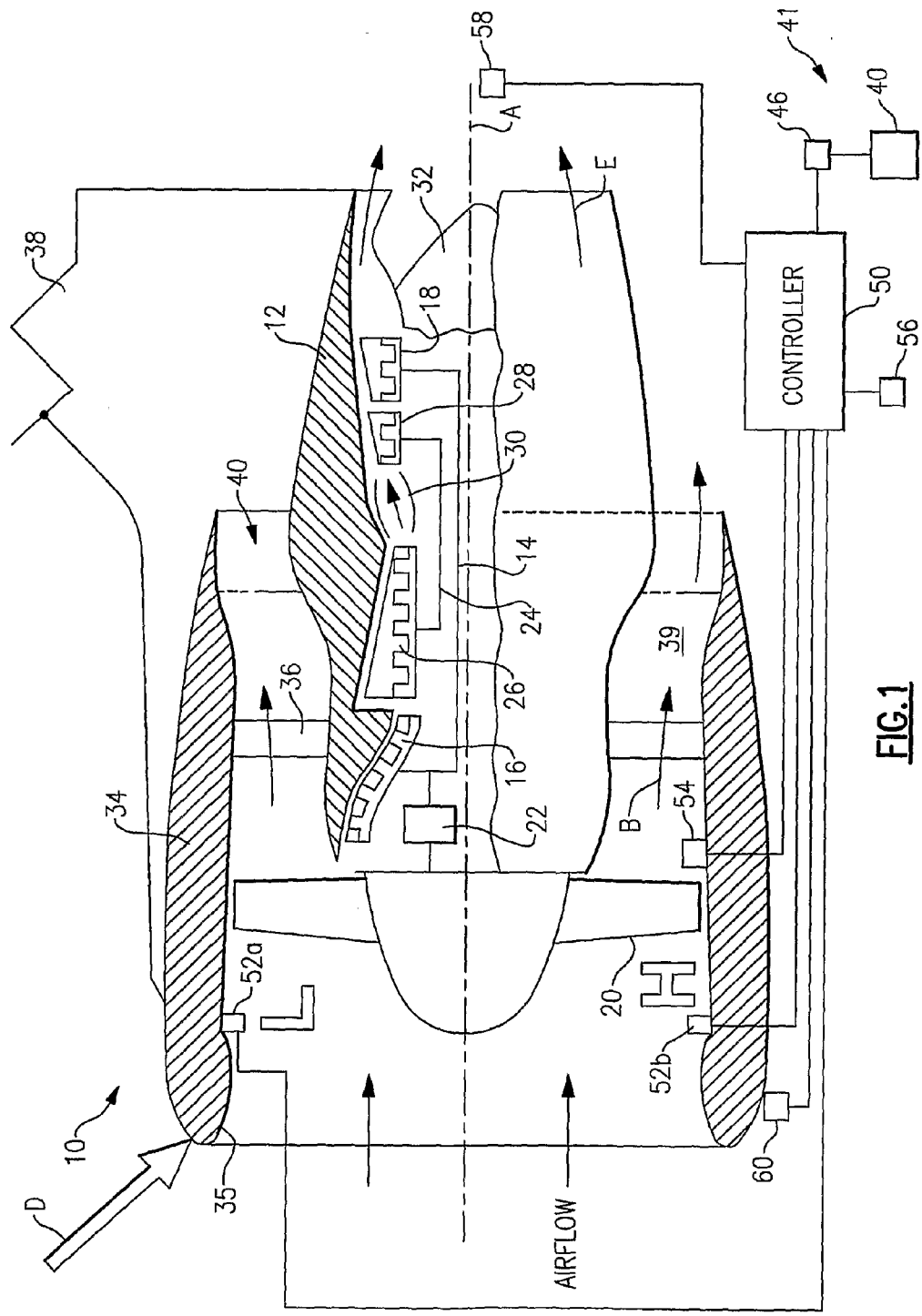
FIG. 1 is a cross-sectional view of an example turbofan engine.

A geared turbofan engine 10 is shown in FIG. 1. A pylon 38 secures the engine 10 to an aircraft. The engine 10 includes a core nacelle 12 that houses a low spool 14 and high spool 24 rotatable about an axis A. The low spool 14 supports a low pressure compressor 16 and low pressure turbine 18. In the example, the low spool 14 drives a turbofan 20 through a gear train 22. The high spool 24 supports a high pressure compressor 26 and high pressure turbine 28. A combustor 30 is arranged between the high pressure compressor 26 and high pressure turbine 28. Compressed air from compressors 16, 26 mixes with fuel from the combustor 30 and is expanded in turbines 18, 28.

In the examples shown, the engine 10 is a high bypass turbofan arrangement. In one example, the bypass ratio is greater than 10:1, and the turbofan diameter is substantially larger than the diameter of the low pressure compressor 16. The low pressure turbine 18 has a pressure ratio that is greater than 5:1, in one example. The gear train 22 is an epicycle gear train, for example, a star gear train, providing a gear reduction ratio of greater than 2.5:1. It should be understood, however, that the above parameters are only exemplary of a contemplated geared turbofan engine. That is, the invention is applicable to other engines including direct drive turbofans.

Airflow enters a fan nacelle 34, which surrounds the core nacelle 12 and turbofan 20. The airflow passes through an inlet cowl 35 provided by the fan nacelle 34 before reaching the turbofan 20. The turbofan 20 directs air into the core nacelle 12, which is used to drive the turbines 18, 28, as is known in the art. Turbine exhaust E exits the core nacelle 12 once it has been expanded in the turbines 18, 28, in a passage provided between the core nacelle and a tail cone 32.

The core nacelle 12 is supported within the fan nacelle 34 by structure 36, which are commonly referred to as upper and lower bifurcations. A generally annular bypass flow path 39 is arranged between the core and fan nacelles 12, 34. The example illustrated in FIG. 1 depicts a high bypass flow arrangement in which approximately eighty percent of the airflow entering the fan nacelle 34 bypasses the core nacelle 12. The bypass flow B within the bypass flow path 39 exits the fan nacelle 34 through a nozzle exit area 40.

For the engine 10 shown in FIG. 1, a significant amount of thrust may be provided by the bypass flow B due to the high bypass ratio. Thrust is a function of density, velocity and area. One or more of these parameters can be manipulated to vary the amount and direction of thrust provided by the bypass flow B. In one example, the engine 10 includes a structure associated with the nozzle exit area 40 to change the physical area and geometry to manipulate the thrust provided by the bypass flow B. However, it should be understood that the nozzle exit area may be effectively altered by other than structural changes, for example, by altering the boundary layer, which changes the flow velocity. Furthermore, it should be understood that any device used to effectively change the nozzle exit area is not limited to physical locations near the exit of the fan nacelle 34, but rather, includes altering the bypass flow B at any suitable location.

The engine 10 has a flow control device 41 that is used to effectively change the nozzle exit area. In one example, the flow control device 41 provides the fan nozzle exit area 40 for discharging axially the bypass flow B pressurized by the upstream turbofan 20 of the engine 10. A significant amount of thrust is provided by the bypass flow B due to the high bypass ratio. The turbofan 20 of the engine 10 is designed for a particular flight condition, typically cruise at 0.8M and 35,000 feet. The turbofan 20 is designed at a particular fixed stagger angle for an efficient cruise condition. The flow control device 41 is operated to vary the nozzle exit area 40 to adjust fan bypass air flow such that the angle of attack or incidence on the fan blade is maintained close to design incidence at other flight conditions, such as landing and take-off. This enables desired engine operation over a range of flight condition with respect to performance and other operational parameters such as noise levels. In one example, the flow control device 41 defines a nominal converged position for the nozzle exit area 40 at cruise and climb conditions, and radially opens relative thereto to define a diverged position for other flight conditions. The flow control device 41 provides an approximately 20% change in the nozzle exit area 40.

In one example, the flow control device 41 includes multiple hinged flaps 42 arranged circumferentially about the rear of the fan nacelle 34. The hinged flaps 42 can be actuated independently and/or in groups using segments 44. In one example, the segments 44 and each hinged flap 42 can be moved angularly using actuators 46. The segments 44 are guided by tracks 48 in one example. In the example shown, the hinged flaps 42 may be manipulated to change the amount and/or direction of thrust.

Figure 3:
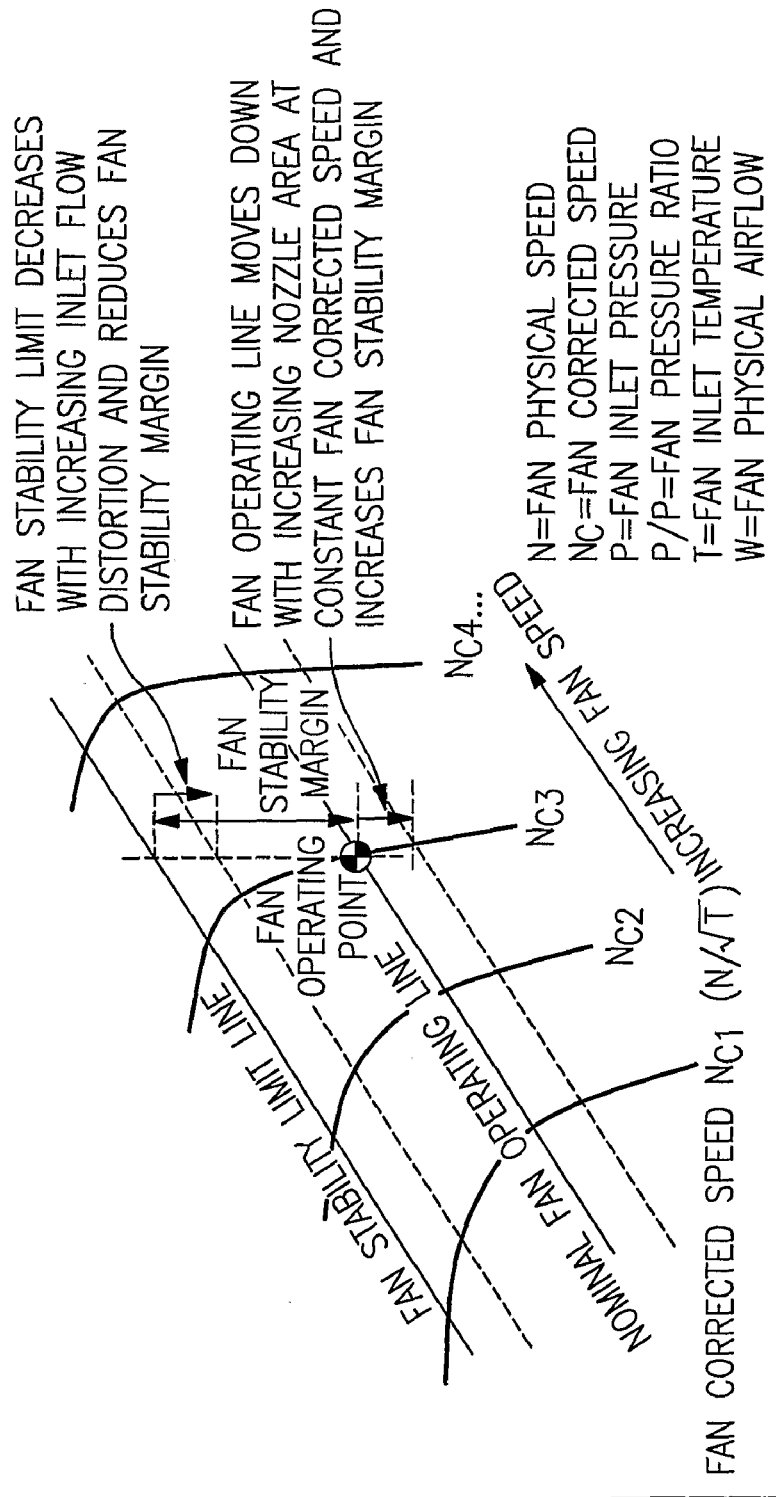
FIG. 3 is an example fan performance map.

The turbofan 20 operates at a set of conditions that can be represented by an operating point on a fan performance map shown in FIG. 3. The operating point is affected by throttle position, speed N of the low spool 14, a pressure P and temperature T entering the turbofan 20 and the airflow W through the turbofan 20. The airflow W is dependent on the nozzle area 40, which establishes the fan operating line. The turbofan 20 has a stability or safety margin within which the turbofan 20 should operate. The operational line must be managed to stay within the stability margin. Reaching an undesired stability margin can result in a stall or flutter condition. Undesired stability margins for the turbofan 20 can occur during conditions in which the airflow does not enter the fan nacelle in a direction parallel with the inlet axis, which also corresponds to the rotational axis A.

Referring to FIG. 1, air flowing into the fan nacelle 34 in a direction D causes a pressure gradient across the inlet side of the turbofan 20 having low and high pressure regions L, H, which can result in the undesired reduction of fan stability margin as shown in FIG. 3. This reduction in stability margin may cause the differential pressure across the turbofan 20 to become unstable.

Figure 2:
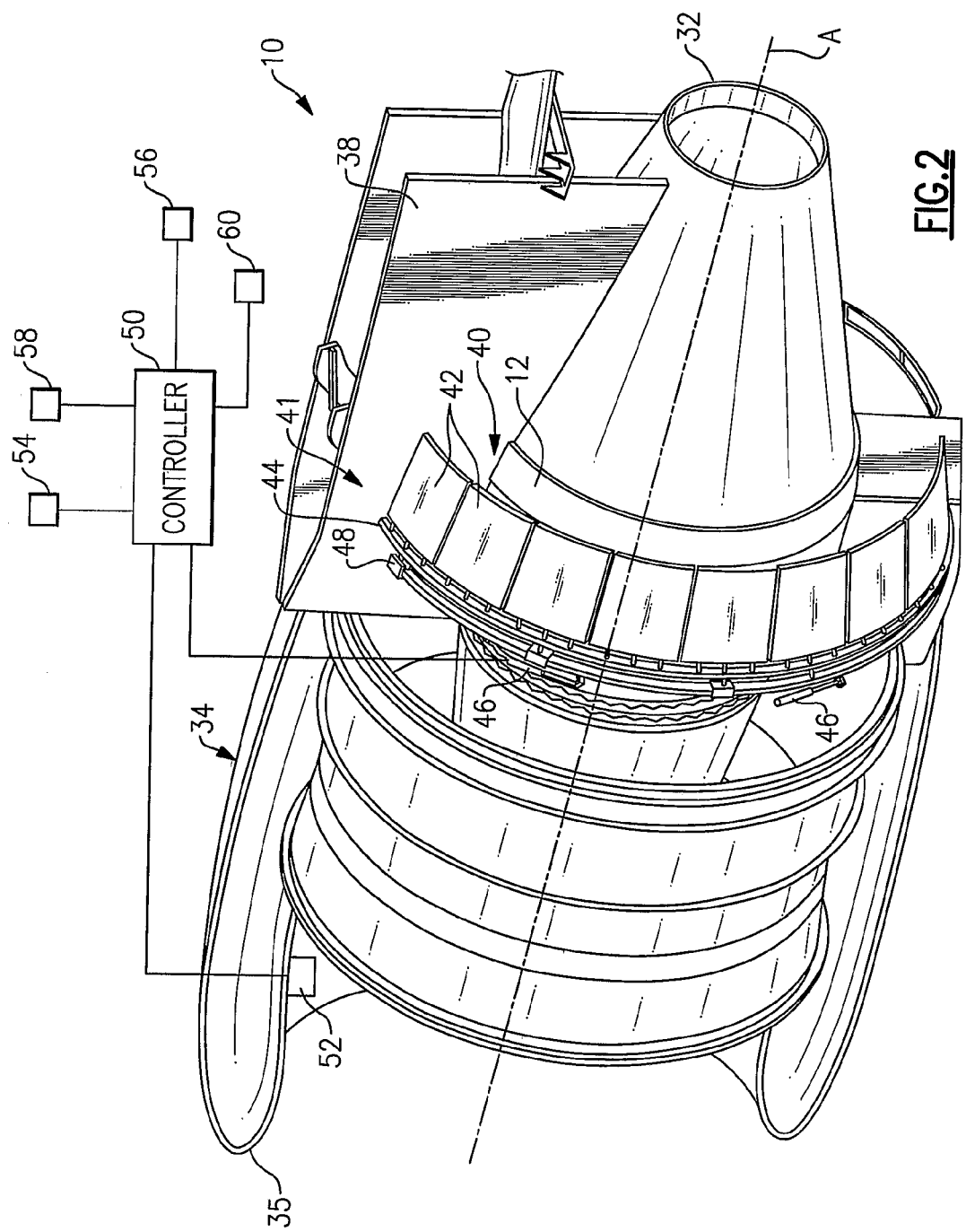
FIG. 2 is a partially broken perspective view of the turbofan engine shown in FIG. 1.

In one example, a controller 50 communicates with inlet pressure sensors 52a, 52b that are used to determine the pressure gradient across the turbofan inlet (only one pressure sensor 52 is shown in FIG. 2). The controller 50 also communicates with a discharge or outlet pressure sensor 54 on the outlet side of the turbofan 20. The discharge pressure sensor 54 alternatively can be located near the inlet to the low pressure compressor 16, for example. The controller 50 uses the information from the pressure sensors 52, 54 to determine a pressure ratio across the turbofan 20 and, in particular, to determine whether there is an undesired pressure gradient entering the turbofan 20 that may result in an undesired stability margin.

A low spool speed sensor 58 communicates the speed of the low spool 14 to the controller 50. A throttle position sensor 56 communicates engine throttle position to the controller 50. In one example, a sensing device 60 is used to determine the direction of the airflow into the engine 10 relative to the inlet axis. The sensing device 60 is located on the airframe and is used by the controller 50 to determine angle of attack, slide slip and/or direction of flight.

Pressure ratio is dependent upon the throttle position, low spool speed, and fan nozzle area, so that with the above information, the controller 50 can determine whether the stability margin for the turbofan 20 is sufficient. If the stability margin is inadequate, the controller 50 commands the flow control device 41 to effectively increase the nozzle exit area 40. Increasing the nozzle exit area 40 decreases the backpressure on the turbofan 20, lowers the fan operating line and increases the fan stability margin. In the example shown in FIG. 2, the controller 50 commands the actuator 46 to open the flaps 42 to physically increase the nozzle exit area 40. The nozzle exit area 40 is adjusted during and/or following aircraft maneuvers, or exposure to cross-winds causing (or likely to cause) turbofan instability. In this manner, the operational line of the turbofan can be managed to improve overall engine performance throughout the flight envelope.

Although an example embodiment of this invention has been disclosed, a worker of ordinary skill in this art would recognize that certain modifications would come within the scope of this invention. For that reason, the following claims should be studied to determine the true scope and content of this invention.

The invention claimed is:

1. A turbofan engine control system for managing a turbofan operating line comprising:
   a spool including a turbine housed in a core nacelle;
   a turbofan coupled to the spool;
   a fan nacelle surrounding the turbofan and core nacelle and providing a bypass flow path having a nozzle exit area; and
   a controller programmed to effectively change the nozzle exit area in response to an undesired stability margin for the turbofan by lowering the turbofan operating line and increasing the turbofan stability margin, wherein the controller detects the undesired stability margin.

2. The turbofan engine control system according to claim 1, wherein the spool is a low spool supporting a low pressure compressor and the turbine is a low pressure turbine.

3. The turbofan engine control system according to claim 2, comprising a high spool rotatable relative to the low spool, the high spool supporting a high pressure compressor downstream from the low pressure compressor.

4. The turbofan engine control system according to claim 1, wherein the undesired stability margin corresponds to a pressure ratio across the turbofan including turbofan inlet and outlet pressures.

5. The turbofan engine control system according to claim 4, wherein the inlet pressure includes multiple pressures indicative of a pressure gradient across a turbofan inlet.

6. The turbofan engine control system according to claim 4, wherein the undesired stability margin is generated during a condition corresponding to an undesired pressure gradient across a turbofan inlet.

7. The turbofan engine control system according to claim 1, comprising first and second pressure sensors in communication with the controller, the controller programmed to determine the undesired stability margin from the first and second pressure sensors.

8. The turbofan engine control system according to claim 1, comprising a speed sensor in communication with the controller, the controller programmed to determine the undesired stability margin from the speed sensor.

9. The turbofan engine control system according to claim 1, comprising a flow control device in communication with the controller, the controller programmed to command the flow control device to effectively increase the nozzle exit area in response to the undesired stability margin.

10. The turbofan engine control system according to claim 9, wherein the flow control device is adapted to increase the physical nozzle exit area in response to the undesired stability margin.

11. The turbofan engine control system according to claim 10, wherein the flow control device is adapted to open flaps arranged around a perimeter of the bypass flow path to increase the physical nozzle exit area.

12. The turbofan engine control system according to claim 10, wherein an actuator is in communication with the controller, the controller programmed to command the actuator to increase the physical nozzle exit area.

13. The turbofan engine control system according to claim 1, comprising a throttle position sensor in communication with the controller, the controller programmed to determine the undesired stability margin from the throttle position sensor.

14. A turbofan engine control system for managing a turbofan operating line comprising:
   a spool including a turbine housed in a core nacelle;
   a turbofan coupled to the spool:, a fan nacelle surrounding the turbofan and core nacelle and providing a bypass flow path having a nozzle exit area;
   a controller programmed to effectively change the nozzle exit area in response to an undesired stability margin for the turbofan by lowering the turbofan operating line and increasing the turbofan stability margin, wherein the controller detects the undesired stability margin; and
   a sensing device in communication with the controller, the controller programmed to determine a direction of airflow into the turbofan engine relative to its inlet axis.

15. A method of managing a turbofan engine turbofan operating line, the method comprising the steps of:
   detecting at least one of a turbofan pressure ratio, low spool speed, airflow direction and throttle position;
   determining the undesired turbofan stability margin from the detecting step;
   effectively increasing a nozzle exit area of a bypass flow path in response to an undesired turbofan stability margin; and
   lowering the turbofan operating line and increasing the turbofan stability margin as a result of the nozzle exit area increasing.

16. The method according to claim 15, wherein the step of effectively changing the nozzle exit area includes physically increasing the nozzle exit area provided between core and fan nacelles.

17. The method according to claim 15, wherein the undesired turbofan stability margin corresponds to an undesired pressure gradient across a turbofan inlet resulting in a decrease in the turbofan stability limit.

18. The method according to claim 15, wherein the detecting step includes determining a direction of airflow into the turbofan engine relative to its inlet axis.

* * * * *